United States Patent

[11] 3,579,129

| [72] | Inventor | Robert G. Irvine<br>Claremont, Calif. |
|---|---|---|
| [21] | Appl. No. | 819,380 |
| [22] | Filed | Apr. 25, 1969 |
| [45] | Patented | May 18, 1971 |
| [73] | Assignee | LTV Ling Altec, Inc.<br>Anaheim, Calif. |

[54] VOLTAGE-HOLDING CIRCUIT AND METHOD
11 Claims, 4 Drawing Figs.

[52] U.S. Cl. .................................. 330/3,
330/35, 330/24, 330/20, 330/51, 330/26
[51] Int. Cl. ........................................ H03f 3/16,
H03f 5/00
[50] Field of Search ............................ 307/238,
235, 246; 328/151; 330/51, 100

[56] References Cited
UNITED STATES PATENTS

| 2,840,707 | 6/1958 | Johnson, Jr. ............... | 328/151 |
| 3,116,458 | 12/1963 | Margopoulos ............. | 328/151X |
| 3,119,984 | 1/1964 | Brandt et al. .............. | 328/151X |
| 3,158,759 | 11/1964 | Jasper ........................ | 328/151X |
| 3,304,507 | 2/1967 | Weekes et al. ............. | 330/100X |
| 3,443,235 | 5/1969 | Newbold ................... | 330/51X |
| 3,504,194 | 3/1970 | Eastman et al. ........... | 307/238 |

*Primary Examiner*—Nathan Kaufman
*Attorney*—Harry R. Lubcke

ABSTRACT: A voltage-holding circuit for sampling a signal voltage at a given instant or at the peak of the voltage and for holding the sampled or peak voltage for an extended period of time; and a method for holding a peak or sampled voltage for an extended period of time.

Patented May 18, 1971

3,579,129

ROBERT G. IRVINE
INVENTOR

BY H.C. Goldwire
ATTORNEY

VOLTAGE-HOLDING CIRCUIT AND METHOD

This invention relates to voltage-holding circuits and methods and, more particularly, to circuits and a method for following the amplitude of an input signal and holding a voltage corresponding to the peak value thereof for use at a later time and for sampling the input signal at a given time and for holding a voltage corresponding to the peak voltage of the sample for use at a later time.

It is frequently useful in the data-processing arts to generate a voltage having a magnitude corresponding to the peak amplitude of an information signal of varying amplitude and to hold the generated voltage for subsequent use. It is also useful to sample a voltage at a given time and to hold a voltage corresponding to the level of the voltage sample for subsequent use. For instance, the voltage generated may be a voltage analog of a mathematical constant employed in a mathematical computation being completed by an electronic computer. The voltage to be held is customarily generated by charging a capacitance of an appropriate predetermined value to the peak value or the sampled value of the information pulse or signal.

It is well known that a capacitance cannot maintain a given, charged condition for an extended length of time without suffering some decay; thus, an increasing amount of error is introduced into the computation performed by the computer as the required holding time is extended.

Additionally, it would be useful if, as a charging voltage is applied to the capacitance, the capacitance would instantaneously charge to a voltage directly and accurately corresponding to the peak voltage to be held. This is not the case, however, and a finite period of time is required for charging the capacitor and some error is introduced. Additional error is often introduced when the held voltage is sampled for use, because a portion of the stored energy is lost through the sampling circuit.

At least two distinct types of holding circuits are known. One type of circuit continuously tracks a signal voltage over a relatively extended period of time and holds the peak value of the signal applied to the circuit during that time, while the second type of circuit samples a varying signal voltage at a given instant and stores a voltage corresponding thereto. Each type of circuit is subject to the shortcomings defined, although there is usually a requirement for greater charging-speed in the sampling-type circuit than in the tracking circuit.

The decay of a held voltage has not been satisfactorily stemmed by holding circuits known to the prior art, for the leakage current from the capacitor has not been satisfactorily controlled during the charging, holding, and sampling operations of the circuits. Circuits have been constructed to compensate for the decay expected, but these circuits have resulted in additional and undesirable error. As additional components have been added to the circuits to control the leakage, additional errors associated with component losses and characteristic variations have been introduced.

Where the components are temperature-sensitive, still another error has been introduced where the holding circuit has been subjected to temperature variations; thus, in many applications, the holding circuit has been subject to the impractical requirement of operation only in a temperature-controlled environment.

Voltage-holding circuits known to the prior art have achieved a dynamic range, at the circuit output, of at least 80 db., but the circuits have been complicated and expensive to produce because they require a relatively large number of components. A simplified circuit which has a wide dynamic range and is economical to produce would constitute a highly desirable addition to the art.

Therefore, a major object of this invention is to provide an improved voltage-holding circuit.

Another object is to provide a voltage-holding circuit which has an improved voltage-decay versus holding-period characteristic.

A further object is to provide a voltage-holding circuit having improved accuracy of correspondence between the voltage held and the signal voltage represented.

Yet another object is to provide a voltage-holding circuit which has improved accuracy of operation in an environment characterized by temperature variations.

Still another object is to provide a voltage-holding circuit having improved capacitor-charging features.

An additional object is to provide a voltage-holding circuit useful either as a tracking and peak-holding circuit or as a sampling and holding circuit.

Another object is to provide a method for storing and holding an accurate representation of a peak or sampled voltage.

Other objects and advantages will be apparent from the specification and claims and from the accompanying drawing illustrative of the invention.

Figure 1:
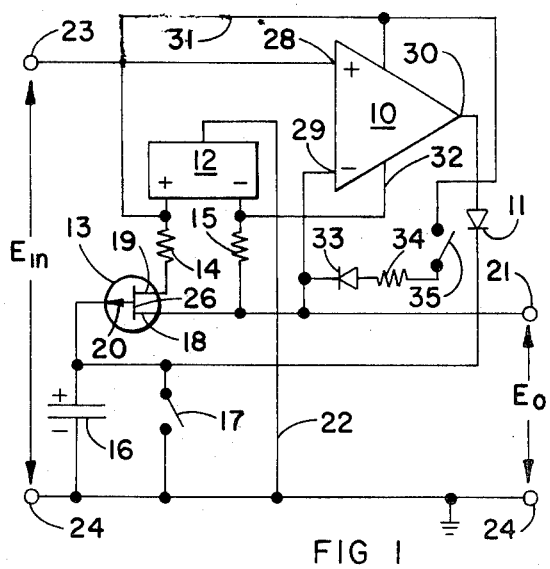
FIG. 1 is a schematic drawing illustrative of the electronic circuit of a preferred embodiment of this invention.

FIG. 1 illustrates an electronic circuit having a signal ground at terminal 24 and operative for holding a voltage applied to the circuit across a pair of terminals 23, 24. The circuit includes amplifying means 10, which is an operational amplifier similar to a Fairchild Model UA 709 and has a first, noninverting input connection 28, a second, inverting input connection 29, and an output connection 30. The Fairchild amplifier mentioned is a monolithic, integrated circuit device. In FIG. 1, the operational amplifier 10 is characterized by the fact that a very small difference of potential between terminals 28 and 29, wherein terminal 28 is positive with respect to terminal 29, causes the voltage at the amplifier output 30 to slue rapidly in a positive direction (not inverted with respect to the input signal) and to saturate at the potential of the power supply 12, which in the circuit shown is 15 volts. The characteristics of alternate configurations and of other connections of the amplifier will be discussed with regard to FIG. 2. The open-loop gain of the operational amplifier 10 (FIG. 1) is in the order of 100,000; however, other, similar operational amplifiers having high open-loop gains are useful in this basic circuit-concept. The positive and negative supply-voltages are provided to the amplifier 10 by leads 31 and 32, respectively. The amplifier input terminal 28 is electrically connected to the circuit input terminal 23, and the output terminal 30 is tied to the anode of a semiconductor diode 11, while the cathode of the diode is connected to the gate electrode 20 of a P-channel field-effect transistor 13. The field-effect transistor 13 is of the junction-type (designated JFET) and has a substrate (P-channel) represented diagrammatically at 26. It is well known that there exists at least one semiconductor junction between the gate electrode 20 and the substrate 26 and that the substrate is connected at one portion thereof to an external connection 19 (referred to as a drain connection) and at an opposite portion thereof to a second external connection 18, (referred to as the source connection). A JFET useful in this circuit is a Siliconix Model E100 with a gate-substrate impedance in the range of 100 to 1,000 megohms and allows only about 30 picoamperes of current-flow through the gate-substrate junction over a substantial range of gating voltages. In the embodiment illustrated, the drain connection 19 is connected through a current-limiting resistor 14 to the positive terminal and the source connection 18 is connected through a current-limiting resistor 15 to the negative terminal of a voltage supply 12. The voltage supply 12 has a connection through a lead 22 to the signal ground 24, thereby providing a reference connection for the positive and negative potentials produced by the supply. The source electrode 18 is also connected directly to the second input terminal 29 of the amplifying means 10 and to a circuit output connection 21.

The cathode of the diode 11 and the gate electrode 20 of the JFET are connected to one plate of a capacitor 16 which has a second plate connected to the signal ground 24. The diode 11 is a unilaterally conductive means providing a very low impedance to current flow from the amplifying means 10 to the capacitor 16 and providing a very high impedance to current flow in the opposite direction. A diode useful in this circuit is a Continental Devices Model CD13336, which has a very high reverse impedance and only allows about 10 picoamperes of reverse current over a wide range of reverse-bias voltages. It now appears that the JFET 13 is positioned to be and is a controlling means for applying a voltage from the supply 12 and corresponding to the voltage level of the capacitor 16 to the second input connection 29 of the amplifier 10.

Positive and negative operating voltages are supplied to the amplifier 10 from the power supply 12 by leads 31 and 32, respectively.

Further, means for discharging the capacitor 16 such that a new charge, corresponding to a new signal-voltage level to be held, can be applied is provided by switch 17, which is connected in parallel with the capacitor 16. It is apparent that the switch 17 can be a semiconductor device, such as a transistor or silicon controlled rectifier, or another, equivalent switching apparatus. The same is true of switch 35 (FIG. 1) and switches 89 and 95 of FIG. 2.

A diode 33 has a cathode connected to the inverting input terminal 29 and an anode connected through a resistor 34 to a first terminal of a switch 35. The second terminal of the switch 35 is connected to the positive side of the voltage supply 12. The diode 33, resistor 34, and switch 35 provide a means for supplying to the circuit of FIG. 1 a pulse which places the circuit into operation for a time-period of a desired duration related to the duration of the pulse, within which period the circuit responds to the maximum voltage then occurring in the input signal by acquiring and holding an equivalent voltage across the capacitor 16. The circuit is thus made capable of sampling the voltage of the input signal at any desired time.

An output voltage ($E_o$) is taken from the circuit between terminals 21 and 24.

Figure 2:
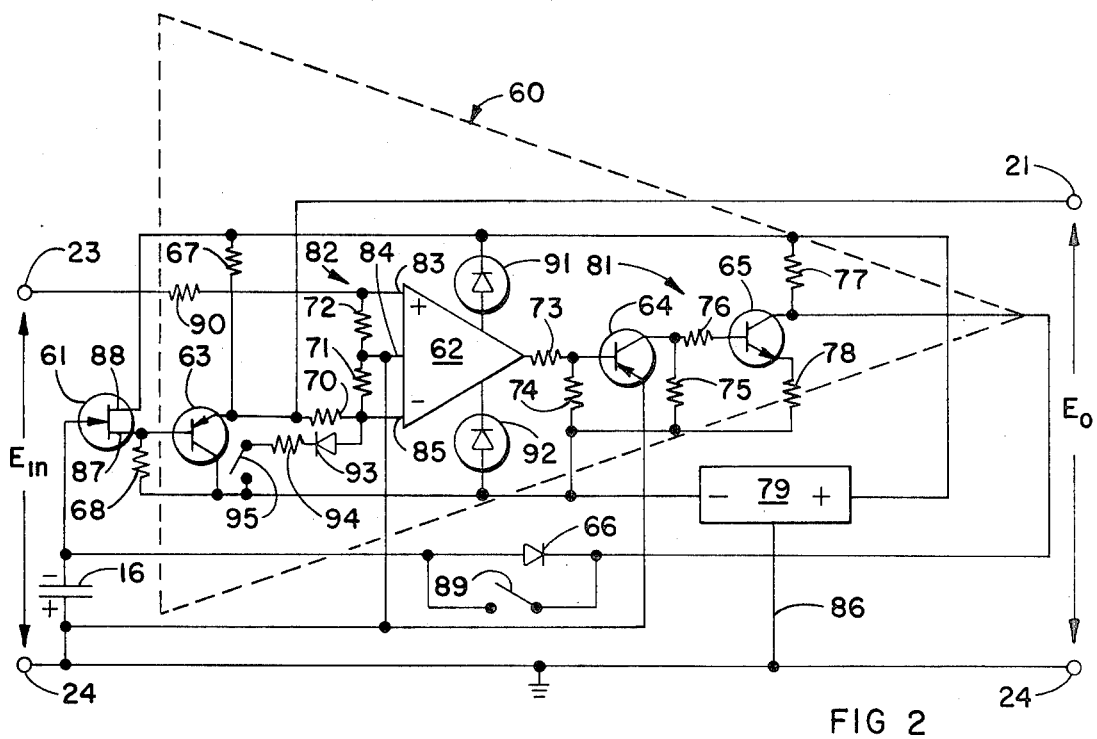
FIG. 2 is a schematic drawing illustrative of the electronic circuit of an alternate, preferred embodiment of this invention.

FIG. 2 illustrates an additional embodiment 80 of the invention which incorporates at least two additional features and illustrates the circuit connections required when an N-channel field-effect transistor, such as 61, is used. This embodiment adds a charging means (shown generally at 81), comparing means (shown generally at 82), and means (including transistor 63) for providing current to a second input connection 85 of the comparing means in response to a change in voltage on the drain electrode 87 of the JFET 61 in order to improve the accuracy of the correspondence between the voltage on capacitor 16 and the signal voltage to be held. In this embodiment, the operational amplifier 10 of FIG. 1 is replaced by an equivalent circuit, generally enclosed by the dashed line 60, which incorporates the additional features set out above, but which performs from input to output in substantially the same manner as the operational amplifier 10 except in the particular aspects discussed in the material that follows.

This embodiment of the invention is designed to operate with a negative input signal applied to input terminal 23; that is, the signal at terminal 23 is negative with respect to a signal ground 24. The input signal is then fed through a resistor 90 to the noninverting input or first connection 83 of a comparator 62. The comparing means 82 includes the comparator 62 which, in the circuit illustrated, is a Fairchild Model UA 710 and includes inverting and noninverting input connections 83, 85 which correspond to the connections 28, 29 (FIG. 1) of the amplifier 10; however, a third input connection 84 (FIG. 2) is connected to the signal ground at terminal 24. The comparator 62 requires input operating voltages which are other than the full value of the respective supply voltages. For instance, the Fairchild comparator requires operating voltages of +12 volts and −6 volts; thus Zener diode 92 is connected between the negative side of the supply 79 (15 volts) and the comparator. The Zener diode 92 is a 9-volt device and has its anode connected to the supply 79 such that there is a 9-volt drop across the Zener diode and only 6 volts are applied to the comparator 62. Similarly, a 3-volt Zener diode 91 is connected between the positive side of the supply 79 (15 volts) and comparator 62, with the cathode of the diode connected to the supply to produce a positive, 12-volt operating voltage. A voltage bridge which is connected across the input of amplifier 62 includes a resistor 72 connected between input terminals 83 and 84 and a resistor 71 connected between input terminals 84 and 85. The resistors 70 and 71 are equal in value and form a portion of a voltage-divider network including resistors 69, 70, 71, 72, and 91.

The output of the comparator 62 is connected through a resistor 73 to the base of transistor 64. A charging means for providing charging current to the capacitor 16 and for charging the capacitor to a voltage level corresponding to the value of the input voltage to be held is shown generally at 81 and includes transistors 64, 65. The emitter of transistor 64 is connected directly to the signal ground 24, and the collector is connected through a resistor 76 to the base of transistor 65. A resistor 75 is connected between the collector of transistor 64 and the negative side of a power supply 79, another resistor 74 is connected from the base of transistor 64 to the negative side of the same power supply, and still another resistor 78 is connected from the emitter of transistor 65 to the same negative supply. As will be shown, the resistor 78 is located in the charging-current path of the capacitor 16, and its value is relatively small compared to the other resistors of the charging means. In the embodiment shown, this value is about 10 ohms. The collector of transistor 65 is connected, through a first lead and a diode 66 to a first plate of the capacitor 16, the cathode of the diode being tied directly to the collector. The second plate of capacitor 16 is connected to the signal ground 24. The collector of transistor 65 is also connected through a resistor 77 to the positive side of the power supply 79. The center tap of the supply 79 is tied to the ground 24 by a lead 86.

The first plate of the capacitor 16 is tied directly to the gate electrode of a junction field-effect transistor 61. The field-effect transistor is of the same general type as the JFET 13 of FIG. 1, and while the JFET 61 is an N-channel device, it has the same type of gate-substrate junction described with respect to the JFET 13 of FIG. 1. The source electrode 87 of JFET 61 is connected directly to the base of transistor 63 and is connected through a resistor 68 to the negative side of the power supply 79, while the drain connection 88 is connected directly to the positive side of the supply.

The transistor 63 and its associated components are a means for providing current to the second input connection 85 of the comparator 62 in response to a voltage change on the source electrode 87 in order to improve the accuracy of the correspondence between the capacitor voltage (which is to be held) and the signal voltage at terminal 23. The collector of transistor 63 is tied directly to the negative side of power supply 79, and the emitter is connected first through a resistor 67 to the positive side of the supply and secondly through resistor 70 to the second input terminal 85 of the comparator 62. The circuit output terminal 21 is connected to the emitter of transistor 63.

A diode 93, a resistor 94, and a switch 95 are connected in series, in the order recited, between the inverting input 85 of the comparator 62 and the negative side of the supply 79. The anode of diode 93 is connected to terminal 85 and the series-connected components provide a means for supplying to the circuit of FIG. 2 a pulse which places the circuit into operation for a time-period of a desired duration related to the duration of the pulse, within which period the circuit responds to the maximum voltage then occurring in the input signal by acquiring and holding an equivalent voltage across the capacitor 16. The circuit is thus made capable of sampling the voltage of the input signal at any desired time.

A means for discharging the capacitor 16 is connected in parallel with the diode 66 and is indicated in the drawing by a switch 89.

Figure 3:
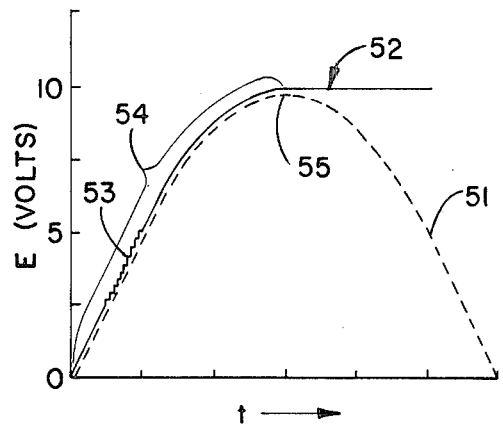
FIG. 3 is a graph representing the response of the electronic circuit of this invention to an input signal.

In operation, a signal which is positive with respect to the signal ground 24 is applied to the holding circuit of FIG. 1 at input 23 and is fed from there directly to the terminal 28 of the differential amplifier 10. The graph of FIG. 3 illustrates the response of the circuits of FIGS. 1 and 2 to an input signal 51. The charging speed of the circuit of FIG. 1 is slower than that of the circuit of FIG. 2 for the reasons set forth below. For instance, the circuit of FIG. 2 charges to the 10 volt peak 55 of signal 51 (FIG. 3) at least as quickly as 24 microseconds, while the circuit of FIG. 1 requires about 1 millisecond. The circuit output voltage is represented by the curve 52, which actually overlies the rising portion of curve 51 but is drawn, for clarity, as slightly displaced from the latter. The output voltage 52 follows the input signal 51 by repetitive steps of the circuit of FIG. 1 when that circuit changes, then holds, then charges again in response to the rising potential across terminals 28 and 29. This stepwise increase of the output voltage 51 occurs throughout a portion of the output curve shown by the bracket 54, the steps being shown (for convenience) only in a portion 53 of the curve. The steps may be large or small, depending on the speed at which the circuit operates. When the input voltage 51 reaches its peak 55, the output voltage holds that voltage when the input voltage begins to decrease in amplitude. When the circuit of FIG. 1 is used as a sampling and holding device, the input signal must be applied for a sufficient period of time to allow the capacitor 16 to charge. (As will be discussed later, the charging-time of the capacitor 16 is reduced by the circuit of FIG. 2.) In the event that a voltage exists at input terminal 29 which is equal or positive with respect to the input voltage at terminal 28, the operational amplifier 10 maintains a negative voltage at the output 30. With a negative voltage at the output 30, the diode 11 is back-biased and no current flows through the diode to capacitor 16. If, however, the voltage at terminal 28 is positive with respect to the voltage at terminal 29, the voltage at the amplifier output 30 slues rapidly in a positive direction until the amplifier saturates. Terminal 28 has been identified as the noninverting input terminal; thus, the output signal at 30 is in phase with the signal applied to the input and is therefore positive in polarity. The positive output-signal provides a forward bias to the diode 11 and current flows through the diode to the capacitor 16, which charges with the polarity shown (i.e., its ungrounded plate becomes positive with respect to ground). Diode 11 provides a very low impedance to current-flow in the forward direction. The capacitor 16 charges at a rate determined by the charging current supplied through the diode and by the size of the capacitor. As the voltage level of the capacitor 16 increases in response to the flow of charging current, the voltage on the gate electrode 20 of the JFET 13 rises accordingly.

The JFET 13 is a P-channel device and is operated in the depletion mode. As a consequence, the voltage on the gate lead 20 must increase by an amount equal to the biasing voltage of the gate-source junction before the voltage on the source-lead can begin to rise; beyond that point, the voltage on the source-lead tracks the rise of gate-voltage very precisely. For the Siliconix device mentioned, the biasing voltage is about 1.5 volts; thus, the voltage on the gate-lead 20 is always 1.5 volts higher than the voltage on the source-electrode 18. Since the voltage on the source-lead 18 is connected directly to the amplifier second input connection 29 (the inverting lead), the voltage at that connection rises accordingly and until it is equal to the input voltage applied to amplifier input connection 28; at this time, the output of the amplifier 10 rapidly switches to at least zero potential and charging current to the capacitor 16 is cut off. At this time, the voltage level of the charged capacitor 16 is greater than the voltage level of the input signal (at terminal 23) by an amount precisely equal to the biasing voltage of the gate-substrate junction 26.

In the usual case, energy stored in a capacitor such as 16 is lost through the charging circuit, the sensing circuit, or the capacitor itself (as by leakage across the plates). In the present invention, each of these major leakage-paths has been effectively blocked, except for the path across the capacitor itself; and the leakage across the capacitor has proven to be nominal and insignificant in comparison with prior leakages through the charging and sensing circuits. The voltage held by the circuit of this invention has substantially improved characteristics with respect to errors formerly occasioned by leakages through the charging and sampling circuits. In the charging circuit, a high-quality, reverse-biased diode 11 has only a nominal leakage-current; for instance, the Continental Devices diode mentioned has a reverse current not exceeding 20 picoamperes over a range of voltages exceeding a voltage range entirely adequate for operation of the present device.

The input impedance of the operational amplifier 10 is on the order of 400,000 ohms, and, if the voltage of the storage capacitor 16 were applied directly to the second input 29, a substantial amount of leakage would occur. When the JFET 13 is placed in the path between the capacitor 16 and the input 29, the impedance to current flow is very substantially increased, for the effective resistance of the gate-substrate junction is on the order of 100 to 1,000 megohms; thus, the leakage-current through this path is reduced by a factor of 100/0.4 or 250 times. The electric field produced by a voltage on the gate-electrode 20 effectively controls the amount of current flowing through the JFET 13, from source to drain; but only a very minute amount of current flows across the junction. Still, the voltage on the source lead of the JFET 13 corresponds directly to the voltage held by the capacitor 16 and differs from that voltage by a precise amount, i.e., the biasing voltage of the JFET gate-electrode junction; thus, the accuracy of the circuit is substantially unimpaired.

Figure 4:
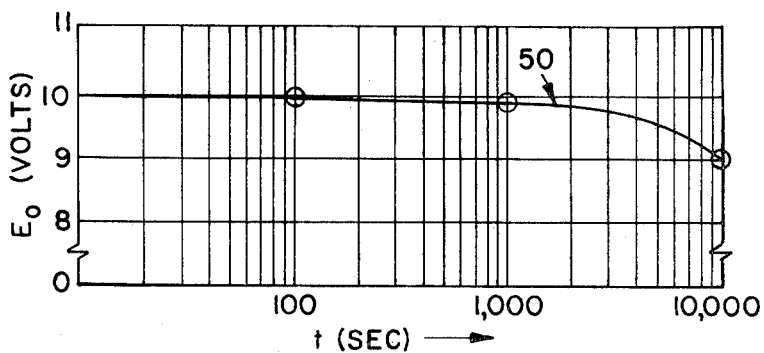
FIG. 4 is a graph illustrating the voltage-holding capacity of the electronic circuit of this invention.

The results obtained by this invention are illustrated in FIG. 4. By actual measurement, a capacitor such as 16, when charged to produce an output voltage of 10 volts, decays at a rate of 100 microvolts per second; thus, after a holding period of 10 seconds, the output-voltage (across terminals 21 and 24) decays by 1 millivolt (0.01 percent error); after 100 seconds, the decay is 10 millivolts (0.1 percent error); after 1,000 seconds, the decay is 1 volt (10 percent error).

With regard to the accuracy of the circuit illustrated, it has been stated that the open-loop gain of the amplifier 10 is very high and in the order of 100,000. Tracing the output signal of the amplifier from terminal 30 through diode 11 to the capacitor 16 and noting, as explained, that the voltage at the amplifier input is in phase with and follows in amplitude (differing only by the bias voltage of the JFET 13) the voltage on the capacitor 16, it is now apparent that the voltage applied to the amplifier input-terminal 29 is effectively (and at that point only) a positive feedback to the amplifier. Internally of the amplifier 10, the phase of the feedback signal is reversed, and it thus becomes a negative or degenerative feedback. It will now be apparent that the amplifier circuit is the equivalent of a closed-loop, negative-feedback system; and it is known that, in such a system and where the amplifier has a very high open-loop gain, the amplifier has unit gain and the accuracy of reproduction of the signal between the input and output is very precise and without more than negligible error. This is easily understood by considering an example in which an amplifier has an input voltage $E_s$ and an output voltage $E_0$; then, the gain (A) of the amplifier is defined as:

$$A = \frac{E_o}{E_s}$$

Where there is feedback, the gain and output-voltage change so that the relation is redefined:

$$A' = \frac{E_o'}{E_s}$$

Where $A'$ is the amplifier gain with feedback and $E_o'$ is the amplifier output, again with the feedback.

The signal-voltage applied to the amplifier with feedback is defined as $E_g' = E_s + \beta E_o'$, where $\beta$ is the feedback voltage divided by the output voltage ($E_o'$). The output voltage with feedback is then $E_o' = (E_s a z \beta E_o')A$ Then:

(1) $$A' = \frac{E_o'}{E_s} = \frac{E_g' A}{E_g'} - \beta E_0'$$

$$\text{or } A' = \frac{A}{1-A\beta}$$

In analyzing equation (1), an important feature of this invention becomes apparent. With negative feedback, as in the case of the embodiment shown in FIG. 1, the value of the denominator of the above equation is greater than 1, and the amplifier gain (A') is reduced. The term $A\beta$ is called the feedback factor, and when this factor is very large with respect to unity and there is negative feedback, the above equation becomes $$(2) \qquad A' = -\frac{1}{\beta}$$

Since the amplifier 10 has a gain of about 100,000, the circuit can be analyzed in accordance with equation (2), wherein it is now apparent that the high-gain amplifier 10 is substantially independent of original gain-variations (changes in A) caused by variations of transistor characteristics, supply voltages, and circuit component variations such as those caused by temperature changes. Each temperature-sensitive component of the circuit, except for the capacitor 16, is located in the feedback loop of the amplifier 10; thus, the above postulation applies, and the accuracy of the circuit is vastly improved, for distortion caused by temperature variation is effectively eliminated.

The amplitude distortion (D) of the output voltage ($E_o$) of an amplifier increases as the output voltage increases; thus, the distortion is a function of the output voltage. Hence,
 $D=f(E_o)$
When there is feedback,
 $D'=f(E_o')+A\beta D'$
Where the last term ($A\beta D'$) is the percentage of the distortion ($A\beta D'$) reamplified by a gain of A. Other terms appearing in the distortion-equation (D') and appearing in the equation because a percentage of $A\beta D'$ is again fed back and reamplified are omitted since each term contains $\beta^2$ and higher orders of gain and thus are negligible. Solving the immediately above equation for D', it is clear that $$(3) \qquad D' = \frac{f(E_o')}{1-A\beta} \text{ or } D' = \frac{D}{1-A\beta}$$

Thus, the distortion-equation (3) also includes the feedback-factor $A\beta$. If the value of the denominator ($1-A\beta$) is larger than 1, it becomes apparent that the distortion with feedback (D') is less than the distortion (D) without feedback; and, if the open-loop gain (A) is very large, the distortion with negative feedback becomes negligible and the input signal is very precisely reproduced. The circuit of the present invention utilizes the precision, negative-feedback amplifier concept to provide vastly improved accuracy in addition to the ability of the circuit to hold the voltage so precisely generated for prolonged periods of time.

In the circuit described, the operational amplifier 10 drives the capacitor 16 directly from output terminal 30, but in certain applications it is desirable to charge the capacitor 16 at a faster rate. In order to accomplish this objective, the embodiment shown in FIG. 2 has incorporated therein charging means 81 for providing charging current from the voltage supply 79 to the capacitor 16 and for charging the capacitor to a level corresponding to the level of the input signal to be held at a faster rate than that at which the capacitor could be charged by the circuit of FIG. 1. In this embodiment (FIG. 2), a charging current of approximately 1 ampere is provided while in the circuit of FIG. 1, the charging rate was about 10 milliamperes.

The embodiment of FIG. 2 employs a comparing means 62 which functions similarly to the operational amplifier of FIG. 1 but which has increased sensitivity and requires a shorter time for output voltage saturation; accordingly, the speed at which the capacitor 16 charges is increased. The circuit also includes means, including the transistor 63, for adding stability to the voltage produced at the source-electrode of the JFET 61.

It has been discovered that the N-channel junction, field-effect transistor as 61 offers more consistent results with regard to impedance to leakage-current flow from the capacitor 16 in that its impedance is more uniform in value and slightly higher than the impedance of a comparable P-channel device. Thus, the embodiment of FIG. 2 illustrates the holding circuit of this invention wherein the N-channel device 61 is used.

The input signal applied to the circuit of FIG. 2 at terminal 23 is negative with respect to the ground-connection 24. This relative polarity is easily accomplished by inverting the signal before applying it to the circuit input 23. The negative signal at terminal 23 is fed through resistor 90 to the input terminal 83 of the comparator 62 and causes a voltage-drop across resistor 72 connected between terminals 84 and 83. If this voltage-drop is not at least offset by a voltage-drop across resistor 71, the comparator output voltage slues rapidly to saturation. The comparator 62, has a common-mode voltage (between terminals 23 and 24) of 5 volts which limits the maximum amplitude of the signal which can safely be applied to the circuit. For this reason, a voltage divider network is provided in association with the amplifier input. The voltage divider network includes resistors 70, 71, 72 and 90; resistors 71 and 72 are of equal value and the value of resistor 70 is equal to the value of resistor 90. The value of the resistor 90 is such that the voltage-drop across resistor 72 to not more than the common-mode voltage (5 volts) of the comparator. The voltage-drop across resistor 70 is equal to the voltage-drop across resistor 90; thus the circuit operates similarly to the circuit of FIG. 1. That is, when the voltage on the emitter of transistor 63 equals the voltage at input terminal 23, the comparator switches off and the charging means 81 is disabled. The output terminal 21 for this circuit is tied to the emitter of transistor 63, and the voltage at that point is equal to the input-signal voltage at terminal 23. Since the output-voltage of the circuit appears at terminal 21 and that terminal is connected by a lead to the emitter of transistor 63, it will be apparent that the lead and terminal constitute a means for providing a circuit output-voltage corresponding to the voltage level of the capacitor 16.

The operational amplifier 10 of FIG. 1 produces an initial output-voltage of 15 volts in response to a positive signal at input terminal 28, while the output voltage of the comparator 62 (FIG. 2) has an output-voltage range which is more restricted and, for an input voltage of at least 1 millivolt, the amplifier saturates at 3 volts; thus, the rise-time is reduced and as a result the comparator operates more rapidly than does the operational amplifier. The voltage-output of the comparing means 82, then, is negative but of a reduced amplitude with respect to the amplitude of the operational amplifier 10 (FIG. 1); thus, the speed of the charge-controlling apparatus has been increased, but the charging power available from the comparator (as compared to the operational amplifier) has been reduced. Therefore, a charging means (indicated generally at 81) for providing charging current from the voltage supply 79 to the capacitor 16 and for rapidly charging the capacitor to a voltage-level corresponding to the voltage-level to be held is provided.

The negative output of the comparing means 82 is applied, through resistor 73, to the base of transistor 64. In order to apply the full charging capacity of the supply 79 to the capacitor 16, the charging means 81 includes a buffer-amplifying stage which includes transistor 64 and a driver stage which includes transistor 65. A negative, 3-volt signal at the base of transistor 64 provides a bias to the transistor to cause it to conduct and to direct an amplified, negative voltage through the resistor 76 and to the base of transistor 65, thereby biasing transistor 65 and causing it to conduct. As transistor 65 conducts, a charging path is provided which extends from the negative terminal of supply 79 and successively through resistor 78, the emitter-collector junction of transistor 65, and diode 66 to the negative plate of capacitor 16 and from the positive plate of capacitor 16 to the signal ground 24. The path is completed by a lead 86 which connected the signal-ground 24 to the center-tap connection of the power supply 79. The negative side of voltage supply 79, therefore, is applied directly across the capacitor 16 and the resistor 78 in response to the presence of a relatively small output-signal at the comparator 62. The supply-voltage, in the embodiment shown, is −15 volts, and the combined resistance of the charging circuit, including resistor 78, limits the charging current to about 1 ampere; hence, the capacitor is rapidly charged at that rate. The voltage on the ungrounded plate of the capacitor 16 is negative with respect to the signal ground 24.

When there is no input voltage or a very small positive input voltage (not exceeding 1 millivolt), the output signal from the comparator 62 is +0.5 volts; thus, the transistor 64 is back-biased and will not conduct and the voltage on the capacitor 16 remains unaffected and is held at its charged value.

Again, as with the embodiment illustrated in FIG. 1, the voltage on the gate electrode of JFET 61 follows the voltage of the capacitor 16. Here, however, voltage applied to the gate-electrode is negative, but an increase in negative voltage causes the current flowing from the source-electrode 87 to the drain electrode 88 to respond in the same manner that an increase in positive voltage caused a change in current-flow through the JFET 13 of FIG. 1; therefore, the voltage at the source electrode 87 (FIG. 2) follows the voltage on the capacitor 16 and differs therefrom by an amount precisely equal to the gate-substrate biasing voltage of the particular JFET used. In this case, the source-voltage exceeds the capacitor voltage by the bias voltage (about 1.5 volts). A characteristic of field-effect transistors is that this bias-voltage remains substantially constant over a wide range of voltages applied to the gate-electrode.

The ability of the source-lead 87 to follow the voltage on the gate-electrode is affected to some extent where the source-lead is connected directly to the noninverting lead of the amplifier, such as 29 of amplifier 10 (FIG. 1). A direct connection of this type would drain current directly from the FET and cause the voltage on the source-lead 87 to fluctuate to a degree depending on the current requirements of the amplifier 62. To eliminate this potential source of error, there is employed the emitter-follower connected transistor 63, which improves the accuracy of the circuit 80 by substantially eliminating the fluctuation in source-voltage caused by loading. The negative-source electrode-voltage is applied to the base of transistor 63, causing it to conduct. Because the emitter-follower 63 has substantially unity gain, the voltage on the emitter of the NPN transistor follows the voltage on the source lead 87 but draws its current from the power supply 79 through resistor 67 while presenting a high impedance to and drawing only a small amount of current from the source-electrode 87.

Current flows from the emitter of transistor 63 through resistor and 70, the inverting lead 85 of the comparator 62, and resistor 71. When the voltage-drop across resistor 71 (from the signal ground to terminal 85) is equal to the voltage-drop from terminal 84 to terminal 83, then the output of the comparator goes to zero (or slightly positive) and the transistor 64 (and thus the charging circuit) is turned off. Again, as with the circuit of FIG. 1, the voltage then held by capacitor 16 is sustained for an extended period of time because of the high impedance to leakage-current flow through the controlling means and the charging means 81 provided, respectively, by JFET 61 and diode 66.

A means for resetting the circuit is provided by switch 89. Upon closing the switch 89, the capacitor 16 is discharged through a current path extending from the negative plate of the capacitor and through, successively, switch 89, and resistor 77 to the positive side of the power supply 79.

The diode 93, resistor 94, and switch 95 are operative as a means for causing the circuit to operate in response to an activating signal-pulse in order to sample an input-signal voltage to be held. When the circuit is to be used as a peak-sampling and holding circuit, the switch 95 is normally closed. When the switch 95 is closed, the full voltage (−15 volts) of the negative supply 79, less voltage-drops across resistor 94 and diode 93, is applied to the inverting lead 85 of the amplifier 62. This voltage is larger in magnitude than the input-voltage applied to terminal 83 of the comparator 62, which input-voltage does not exceed a maximum value of about 10 volts; thus, the voltage at terminal 85 is always more negative than the voltage at the input terminal 83; and the comparator output voltage, in response thereto, is always positive. When the switch 95 opens, the circuit operates in the usual manner, previously described. It has previously been stated that, in one of its forms, the switch 95 is a transistor converted to function as a normally closed switch; thus, a signal-pulse can be applied to the base of such a transistor to cause the switch to open in the manner described above. Such a transistor employed as a switch 95 is a convenient way to cause the circuit to operate, since a pulse of a known duration can be applied to the base of the transistor to cause it to activate the circuit for a specific period of time and thus to allow the circuit to charge the capacitor 16 to the proper value to be held. A similarly operative circuit is provided in FIG. 1 and includes diode 33, resistor 34, and switch 35.

The method for holding, for an extended period of time, a voltage corresponding to the peak value of a first signal-voltage includes the step of storing electrical energy at a voltage-level corresponding to the peak value of the first signal-voltage, which is applied to the circuit. As was shown in the preceding material, the peak value may be either positive or negative with respect to the signal ground, depending upon the circuitry employed. The next step is that of controlling the voltage level of a second signal-voltage in response to the voltage level of the stored energy, and the last step is that of preventing leakage of the stored energy while storing and controlling the respective signal voltages. In this manner, the stored voltage is effectively isolated from the apparatus for sampling and using the stored voltage. The leakage-current is controlled while the power provided to the sampling circuit is provided from another source, such as a power supply. In this manner, the stored voltage can be repetitively sampled without deterioration of the stored voltage by sampling losses.

It is apparent that other variations and modifications may be made without departing from the present invention. Accordingly, it should be understood that the forms of the present invention described above and shown in the accompanying drawing are illustrative only and not intended to limit the scope of the invention.

I claim:

1. An electronic circuit having a signal ground and operative for holding a voltage which corresponds to the peak value of an input signal applied to the circuit comprising:

a capacitor;

amplifying means having first and second input connections and an output connection operative for charging the capacitor to a voltage level corresponding to a continuously observed peak value of the signal voltage and for controlling the application of charging current to the capacitor in response to a voltage differential across said first and second input connections, the input signal voltage being applied between the first of said input connections and the signal ground;

unilaterally conductive means connected between the output connection of the amplifying means and the capacitor for providing a very low impedance to current flow from the amplifying means to the capacitor and providing a very high impedance to current flow in the opposite direction;

a voltage supply;

controlling means for applying a voltage from the supply and corresponding to the voltage level of the capacitor to the second input connection of the amplifying means to reduce the voltage differential across the input connections of the amplifying means, as the capacitor is charged, to at least zero volts, whereby the charge on the capacitor is brought into correspondence with the peak value of the signal voltage, said controlling means including means having a semiconductor junction for presenting a very high impedance to current flow from the capacitor to the controlling means; and a circuit output connection to the second input connection of the amplifying means.

2. The circuit claimed in claim 1 and including means for discharging the capacitor such that a new charge, corresponding to a new signal-voltage level to be held, can be applied.

3. The circuit claimed in claim 1 wherein the unilaterally conductive means providing a very low impedance to current flow from the amplifying means to the capacitor and providing a very high impedance to current flow in the opposite direction is a diode.

4. The circuit claimed in claim 1 wherein the controlling means is a junction field-effect transistor and the means for preventing a very high impedance to current flow from the capacitor to the controlling means is a junction between at least one gate electrode and the channel substrate of the field-effect transistor.

5. The circuit claimed in claim 4 wherein the gate electrode of the field-effect transistor is connected to the capacitor and wherein the voltage on at least one of the remaining electrodes of the transistor differs from the gate voltage by an amount equal to the bias voltage of the transistor junction.

6. The circuit claimed in claim 4 wherein the field-effect transistor has a P-channel substrate and the at least one electrode of the transistor other than the gate electrode is connected to the amplifying means.

7. The circuit claimed in claim 4 wherein the field-effect transistor has an N-channel substrate and the at least one electrode of the transistor other than the gate electrode is connected to the amplifying means.

8. The circuit claimed in claim 4 wherein the field-effect transistor is operated in the depletion mode.

9. The circuit in claim 1 having temperature-dependent components therein and wherein the amplifying means is a differential amplifier having means for providing degenerative feedback connected between the output of the amplifier and the second input connection and wherein a major portion of the temperature-dependent components of the circuit are serially connected between the output connection of the amplifier and the second input connection to reduce inaccuracies of the circuit caused by variations of the characteristics of the temperature-dependent components in response to temperature changes in the environment of the circuit.

10. An electronic circuit having a signal ground and for holding a voltage which corresponds to a continuously observed peak value of an input signal voltage applied to the circuit comprising:

a capacitor;

a voltage supply;

charging means for providing charging current from the voltage supply to the capacitor and for rapidly charging the capacitor to a voltage level corresponding to the voltage to be held;

continuously operative comparing means having first and second input connections and an output connection for controlling the application of charging current from the charging means to the capacitor in response to the presence of a potential difference across the input connections, and wherein the input signal is applied to the comparing means between the first input connection and a signal ground;

unilaterally conductive means connected between the output connection of the comparing means and the capacitor for providing a very low impedance to current flow from the charging means to the capacitor and providing a very high impedance to current flow in the opposite direction;

controlling means responsive to the voltage level of the capacitor for applying voltage from the supply and at a level corresponding to the voltage level of the capacitor to the second input connection of the comparing means, such that as the voltage level of the capacitor rises in response to charging current being applied thereto, the voltage differential across the comparing means input connections is reduced to at least zero volts causing the charging means to cease charging the capacitor, said controlling means including means having a semiconductor junction for presenting a very high impedance to current flow from the capacitor; and means for providing a circuit output-voltage corresponding to the voltage level of the capacitor.

11. The electronic circuit claimed in claim 10 wherein the controlling means includes a junction field-effect transistor having a source electrode, said electronic circuit including means for providing current to the second input connection of the comparing means in response to a voltage change on the source electrode in order to improve the accuracy of the correspondence between the capacitor voltage and the signal voltage to be held.